US010751888B2

(12) United States Patent
Bidram et al.

(10) Patent No.: US 10,751,888 B2
(45) Date of Patent: Aug. 25, 2020

(54) MANIPULATOR APPARATUS FOR OPERATING ON ARTICLES

(71) Applicant: ADVANCED INTELLIGENT SYSTEMS INC., Burnaby (CA)

(72) Inventors: Farhang Bidram, West Vancouver (CA); Amirmasoud Ghasemi Toudeshki, Coquitlam (CA)

(73) Assignee: Advanced Intelligent Systems Inc., Burnaby, British Columbia (CA)

( * ) Notice: Subject to any disclaimer, the term of this patent is extended or adjusted under 35 U.S.C. 154(b) by 0 days.

(21) Appl. No.: 16/509,900

(22) Filed: Jul. 12, 2019

(65) Prior Publication Data

US 2020/0108496 A1 Apr. 9, 2020

Related U.S. Application Data

(60) Provisional application No. 62/741,151, filed on Oct. 4, 2018, provisional application No. 62/810,903, filed on Feb. 26, 2019.

(51) Int. Cl.
*B25J 18/02* (2006.01)
*B25J 9/04* (2006.01)
(Continued)

(52) U.S. Cl.
CPC ............. *B25J 18/025* (2013.01); *B25J 5/007* (2013.01); *B25J 9/042* (2013.01); *B25J 15/0019* (2013.01);
(Continued)

(58) Field of Classification Search
CPC ....... B25J 9/162; B25J 18/025; B25J 19/0041
See application file for complete search history.

(56) References Cited

U.S. PATENT DOCUMENTS 4,004,677 A 1/1977 Heier et al.
4,527,942 A * 7/1985 Smith ................. B23Q 1/5475
414/590

(Continued)

FOREIGN PATENT DOCUMENTS

CA 2622940 A1 3/2007
CA 3026002 A1 3/2018
(Continued)

OTHER PUBLICATIONS

International Search Report and Written Opinion of the International Searching Authority issued by the Canadian Intellectual Property Office in connection with International Patent Application No. PCT/CA2019/051366, dated Jan. 29, 2020, 11 pages.
(Continued)

*Primary Examiner* — Thomas Randazzo

(57) ABSTRACT

A manipulator apparatus for operating on articles is disclosed. The apparatus includes a column having a mounting portion for securing the manipulator to a base and an extensible portion that is moveable over an extension range with respect to the mounting portion in response to an actuation force provided by a column actuator. The apparatus also includes an arm mounted to the extensible portion of the column at an arm joint and rotatable about the arm joint in response to an actuation torque provided by an arm rotation actuator. The apparatus further includes an end effector operably configured to perform an operation on the articles, the end effector being mounted at an end effector joint disposed at an end of the arm distal to the arm joint, the end effector being rotatable about the end effector joint in response to an actuation torque provided by an end effector rotation actuator. The rotation of the end effector occurs within an end effector movement plane and the rotation of the arm occurs within an arm movement plane, the respective movement planes being substantially parallel to each (Continued)

other, and the extensible portion of the column is moveable in a direction normal to the respective movement planes and the extensible portion of the column causes the arm joint to be disposed to permit clearance for a full 360° rotation of the arm over at least a portion of the extension range of the extensible portion of the column to provide an operating range within which the end effector is able to move for operating on the articles.

21 Claims, 6 Drawing Sheets

(51) Int. Cl.
*B25J 5/00* (2006.01)
*B25J 15/06* (2006.01)
*B25J 15/00* (2006.01)
*B25J 19/02* (2006.01)
*B25J 17/02* (2006.01)

(52) U.S. Cl.
CPC ....... *B25J 15/0616* (2013.01); *B25J 17/0258* (2013.01); *B25J 19/022* (2013.01); *B25J 19/023* (2013.01)

(56) References Cited

U.S. PATENT DOCUMENTS

| | | |
|---|---|---|
| 4,536,690 A | 8/1985 | Belsterling et al. |
| 4,600,355 A | 7/1986 | Johnson |
| 4,621,562 A | 11/1986 | Carr et al. |
| 4,636,137 A | 1/1987 | Lemelson |
| 4,678,390 A | 7/1987 | Bonneton et al. |
| 4,698,775 A | 10/1987 | Koch et al. |
| 4,829,840 A | 5/1989 | Torii et al. |
| 5,017,084 A | 5/1991 | Lemelson |
| 5,358,568 A | 10/1994 | Okano et al. |
| 5,491,540 A | 2/1996 | Hirst |
| 5,503,513 A | 4/1996 | Detriche |
| 5,523,662 A | 6/1996 | Goldenberg et al. |
| 5,550,953 A | 8/1996 | Seraji |
| 5,682,313 A | 10/1997 | Edlund et al. |
| 5,710,870 A | 1/1998 | Ohm et al. |
| 5,737,500 A | 4/1998 | Seraji et al. |
| 5,787,322 A | 7/1998 | Sass et al. |
| 5,809,375 A | 9/1998 | Owens, Jr. et al. |
| 5,887,229 A | 3/1999 | Sass et al. |
| 6,473,371 B1 | 10/2002 | White |
| 6,494,666 B2 | 12/2002 | Wu et al. |
| 6,507,163 B1 | 1/2003 | Allen |
| 6,898,484 B2 | 5/2005 | Lemelson et al. |
| 7,240,879 B1 | 7/2007 | Cepollina et al. |
| 7,496,314 B2 | 2/2009 | Lombardo et al. |
| 8,010,230 B2 | 8/2011 | Zini et al. |
| 8,099,191 B2 | 1/2012 | Blanc et al. |
| 8,160,747 B1 | 4/2012 | Blackwell et al. |
| 8,229,595 B2 | 7/2012 | Seelinger et al. |
| 8,229,622 B2 | 7/2012 | Payne et al. |
| 8,360,178 B2 | 1/2013 | Goldenberg et al. |
| 8,588,976 B2 | 11/2013 | Mangaser et al. |
| 8,676,425 B2 | 3/2014 | Jones et al. |
| 8,777,547 B2 | 7/2014 | Kremerman et al. |
| 8,915,692 B2 | 12/2014 | Grinnell et al. |
| 8,958,916 B2 | 2/2015 | Setrakian et al. |
| 9,076,830 B2 | 7/2015 | Kremerman et al. |
| 9,114,440 B1 | 8/2015 | Colucci et al. |
| 9,120,622 B1 * | 9/2015 | Elazary .................. B25J 9/1697 |
| 9,238,304 B1 | 1/2016 | Bradski et al. |
| 9,254,897 B2 | 2/2016 | Andrieu et al. |
| 9,440,352 B2 | 9/2016 | Meier et al. |
| 9,486,921 B1 | 11/2016 | Straszheim et al. |
| 9,505,136 B1 | 11/2016 | Nusser et al. |
| 9,751,693 B1 | 9/2017 | Battles et al. |
| 9,770,825 B2 | 9/2017 | Goldenberg et al. |
| 9,785,911 B2 * | 10/2017 | Galluzzo ................... B25J 5/007 |
| 9,827,683 B1 * | 11/2017 | Hance ................ G05B 19/4189 |
| 9,889,562 B1 | 2/2018 | Rembisz |
| 9,902,560 B2 | 2/2018 | Porat |
| 9,919,872 B2 | 3/2018 | Khodl et al. |
| 9,952,589 B1 | 4/2018 | Brazeau |
| 9,958,854 B2 | 5/2018 | Vasquez et al. |
| 10,029,369 B1 * | 7/2018 | Carlisle ................... B25J 9/042 |
| 10,059,006 B2 | 8/2018 | Rublee |
| 10,065,314 B2 | 9/2018 | Tian et al. |
| 10,108,185 B1 | 10/2018 | Theobald |
| 10,144,128 B1 | 12/2018 | Kolb et al. |
| 10,214,400 B2 | 2/2019 | High et al. |
| 10,336,592 B2 | 7/2019 | Atchley et al. |
| 2001/0035065 A1 * | 11/2001 | Hashimoto ............ B25J 18/025 |
| | | 74/490.04 |
| 2004/0243280 A1 | 12/2004 | Bash et al. |
| 2005/0222713 A1 | 10/2005 | Kawabe et al. |
| 2008/0282494 A1 | 11/2008 | Won et al. |
| 2009/0157224 A1 | 6/2009 | Blanc et al. |
| 2011/0010007 A1 | 1/2011 | Sarh et al. |
| 2011/0172850 A1 | 7/2011 | Paz-Meidan et al. |
| 2011/0301757 A1 | 12/2011 | Jones et al. |
| 2012/0029697 A1 | 2/2012 | Ota et al. |
| 2013/0054024 A1 | 2/2013 | Bruemmer et al. |
| 2013/0110281 A1 | 5/2013 | Jones et al. |
| 2013/0181544 A1 | 7/2013 | Comins et al. |
| 2014/0363264 A1 | 12/2014 | Gowa et al. |
| 2015/0032252 A1 * | 1/2015 | Galluzzo .............. B25J 15/0608 |
| | | 700/218 |
| 2015/0050111 A1 | 2/2015 | Townsend |
| 2015/0066281 A1 | 3/2015 | Allen et al. |
| 2015/0151933 A1 | 6/2015 | Grinnell et al. |
| 2016/0059411 A1 * | 3/2016 | Richter .................... B25J 5/007 |
| | | 701/23 |
| 2016/0075014 A1 | 3/2016 | Bruemmer |
| 2016/0101940 A1 | 4/2016 | Grinnell et al. |
| 2016/0176638 A1 | 6/2016 | Toebes |
| 2016/0187886 A1 | 6/2016 | Jones et al. |
| 2016/0257212 A1 | 9/2016 | Thompson et al. |
| 2016/0259028 A1 | 9/2016 | High et al. |
| 2016/0259341 A1 | 9/2016 | High et al. |
| 2016/0259342 A1 | 9/2016 | High et al. |
| 2016/0259343 A1 | 9/2016 | High et al. |
| 2016/0259345 A1 | 9/2016 | McHale et al. |
| 2016/0260054 A1 | 9/2016 | High et al. |
| 2016/0260161 A1 | 9/2016 | Atchley et al. |
| 2016/0261698 A1 | 9/2016 | Thompson et al. |
| 2016/0318494 A1 | 11/2016 | Henry et al. |
| 2016/0325432 A1 * | 11/2016 | Tian ....................... B25J 19/023 |
| 2016/0349758 A1 | 12/2016 | Wang et al. |
| 2017/0009417 A1 | 1/2017 | High et al. |
| 2017/0010608 A1 | 1/2017 | High et al. |
| 2017/0010609 A1 | 1/2017 | High et al. |
| 2017/0020354 A1 | 1/2017 | High et al. |
| 2017/0024806 A1 | 1/2017 | High et al. |
| 2017/0166399 A1 * | 6/2017 | Stubbs ................... B25J 9/0096 |
| 2017/0172676 A1 * | 6/2017 | Itkowitz ................. A61B 34/37 |
| 2017/0174431 A1 * | 6/2017 | Borders ................. B65G 67/02 |
| 2017/0183159 A1 | 6/2017 | Weiss |
| 2017/0248966 A1 | 8/2017 | Lutz et al. |
| 2017/0283171 A1 | 10/2017 | High et al. |
| 2017/0341231 A1 * | 11/2017 | Tan ........................... B25J 9/162 |
| 2017/0349376 A1 | 12/2017 | Porat |
| 2018/0001479 A1 | 1/2018 | Li et al. |
| 2018/0080882 A1 * | 3/2018 | Boyer .................... B25J 18/025 |
| 2018/0127999 A1 | 5/2018 | Durvasula et al. |
| 2018/0162469 A1 | 6/2018 | Blankespoor et al. |
| 2018/0281143 A1 | 10/2018 | Albert et al. |
| 2018/0290290 A1 * | 10/2018 | Uchiyama .............. B25J 9/0096 |
| 2018/0314265 A1 * | 11/2018 | Matsuno ............... G05D 1/0274 |
| 2018/0326575 A1 * | 11/2018 | Hasegawa ................ B25J 9/043 |
| 2018/0349843 A1 | 12/2018 | High et al. |
| 2018/0354143 A1 | 12/2018 | Dorfman |
| 2018/0361571 A1 | 12/2018 | Georgeson et al. |
| 2019/0033837 A1 * | 1/2019 | Zanger ..................... B25J 5/007 |

(56) References Cited

U.S. PATENT DOCUMENTS

| | | | | |
|---|---|---|---|---|
| 2019/0138009 A1* | 5/2019 | Saito | ............... | B25J 5/007 |
| 2019/0224846 A1* | 7/2019 | Pivac | ............... | B25J 9/1638 |

FOREIGN PATENT DOCUMENTS

| | | |
|---|---|---|
| CN | 1611331 A | 5/2005 |
| CN | 203305214 A | 11/2013 |
| CN | 104133472 A | 11/2014 |
| CN | 104249366 A | 12/2014 |
| CN | 205219095 | 5/2016 |
| CN | 105729441 A | 7/2016 |
| CN | 106002932 A | 10/2016 |
| CN | 106272381 A | 1/2017 |
| CN | 106272415 A | 1/2017 |
| CN | 107753105 A | 3/2018 |
| CN | 108335458 A | 7/2018 |
| DE | 3416435 A1 | 11/1985 |
| DE | 102015220066 A1 | 4/2017 |
| DE | 102016009548 B3 | 8/2017 |
| DE | 102016222255 B3 | 4/2018 |
| DE | 102017009939 A | 4/2019 |
| EP | 0304342 A2 | 2/1989 |
| EP | 0388288 A1 | 9/1990 |
| EP | 0441397 A1 | 8/1991 |
| EP | 0616275 B1 | 9/1998 |
| EP | 2147757 A1 | 1/2010 |
| EP | 2296071 A1 | 3/2011 |
| EP | 2631040 A2 | 8/2013 |
| EP | 2546711 B1 | 5/2018 |
| EP | 3415284 A2 | 12/2018 |
| EP | 3418245 A1 | 12/2018 |
| FR | 2492784 | 4/1982 |
| JP | S6449237 A | 2/1989 |
| JP | H04310382 A | 11/1992 |
| JP | H05201547 A | 8/1993 |
| JP | 3188953 B2 | 7/2001 |
| JP | 2009196381 A | 9/2009 |
| JP | 2016000432 A | 1/2016 |
| JP | 5900462 B2 | 4/2016 |
| JP | 6531968 B2 | 6/2019 |
| KR | 20070011495 A | 1/2007 |
| KR | 101038473 B1 | 6/2011 |
| KR | 101059929 B1 | 8/2011 |
| WO | 2004103864 A1 | 7/2006 |
| WO | 2007008797 A1 | 1/2007 |
| WO | 2013066534 A1 | 5/2013 |
| WO | 2015038705 A1 | 3/2015 |
| WO | 2016161449 A1 | 10/2016 |
| WO | 2017197305 A1 | 11/2017 |
| WO | 2018045448 A1 | 3/2018 |
| WO | 2018114041 A1 | 6/2018 |
| WO | 2018140471 A1 | 8/2018 |
| WO | 2018152268 A1 | 8/2018 |
| WO | 2018162491 A1 | 9/2018 |
| WO | 2018170102 A1 | 9/2018 |
| WO | 2018205198 A1 | 11/2018 |
| WO | 2018213164 A1 | 11/2018 |
| WO | 2018213931 A1 | 11/2018 |
| WO | 2019028226 A1 | 2/2019 |
| WO | 2019055281 A3 | 3/2019 |

OTHER PUBLICATIONS

International Search Report and Written Opinion of the International Searching Authority issued by the Canadian Intellectual Property Office in connection with International Patent Application No. PCT/CA2019/051390, dated Jan. 21, 2020, 9 pages.

International Search Report and Written Opinion of the International Searching Authority issued by the Canadian Intellectual Property Office in connection with International Patent Application No. PCT/CA2017/000057, dated Jul. 25, 2017, 14 pages.

International Search Report and Written Opinion of the International Searching Authority issued by the Canadian Intellectual Property Office in connection with International Patent Application No. PCT/CA2019/000022, dated May 3, 2019, 7 pages.

International Search Report and Written Opinion of the International Searching Authority issued by the Canadian Intellectual Property Office in connection with International Patent Application No. PCT/CA2019/050311, dated May 24, 2019, 12 pages.

Kielhofer, Simon, European Patent Office, Extended European Search Report, in connection with related European Patent Application No. 17847836, dated Aug. 20, 2019, 8 pages.

* cited by examiner

MANIPULATOR APPARATUS FOR OPERATING ON ARTICLES

RELATED APPLICATIONS

This application claims the benefit of provisional patent application 62/741,151 entitled "MOBILE WORK STATION WITH SCARA MANIPULATOR", filed on Oct. 4, 2018 and incorporated herein by reference in its entirety. This application also claims the benefit of provisional patent application 62/810,903 entitled "ROBOTIC PLATFORM WITH INTEGRATED SCARA CONFIGURATION MANIPULATOR", filed on Feb. 26, 2019 and incorporated herein by reference in its entirety.

BACKGROUND

1. Field

This disclosure relates generally to robotic manipulators for operating on articles.

2. Description of Related Art

Selective Compliance Articulated Robot Arm (SCARA) manipulators generally include at least two rotational and one translational degrees of freedom, and further include an additional degree of freedom at an end effector. These manipulators robotic systems with flexibility in accessing and manipulating objects. Commonly the rotational degrees of freedom are provided by an arm and the translational degree of freedom is provided at the end of the arm, for example, at an end effector or tool. In applications where the translation degree of freedom has a large bulk and/or mass in a linear actuator this may compromise stability. This may be problematic where the manipulator is mounted on a robotic vehicle, since the relatively heavy actuator located away from the mobile vehicles center of mass may cause stability problems for the vehicle.

Robotic vehicles may be configured to carry out a task autonomously or semi-autonomously for a variety of applications including product transportation and material handling. Autonomous mobile robotic vehicles typically have the ability to navigate and to detect objects automatically and may be used alongside human workers, thereby potentially reducing the cost and time required to complete otherwise inefficient operations such as basic labor, transportation and maintenance.

SUMMARY

In accordance with one disclosed aspect there is provided a manipulator apparatus for operating on articles. The apparatus includes a column having a mounting portion for securing the manipulator to a base and an extensible portion that is moveable over an extension range with respect to the mounting portion in response to an actuation force provided by a column actuator. The apparatus also includes an arm mounted to the extensible portion of the column at an arm joint and rotatable about the arm joint in response to an actuation torque provided by an arm rotation actuator. The apparatus further includes an end effector operably configured to perform an operation on the articles, the end effector being mounted at an end effector joint disposed at an end of the arm distal to the arm joint, the end effector being rotatable about the end effector joint in response to an actuation torque provided by an end effector rotation actuator. The rotation of the end effector occurs within an end effector movement plane and the rotation of the arm occurs within an arm movement plane, the respective movement planes being substantially parallel to each other, and the extensible portion of the column is moveable in a direction normal to the respective movement planes and the extensible portion of the column causes the arm joint to be disposed to permit clearance for a full 360° rotation of the arm over at least a portion of the extension range of the extensible portion of the column to provide an operating range within which the end effector is able to move for operating on the articles.

Motion of the arm about the arm joint may be constrained by the column when the extensible portion of the column is un-extended.

The extensible portion of the column may include at least first and second movement stages, the first movement stage being mounted for movement with respect to the mounting portion and the second movement stage being mounted on the first movement stage for movement with respect to the first movement stage, the arm joint being disposed at a distal end of the second movement stage.

The arm may include an intermediate joint disposed between the arm joint and the end effector joint, the intermediate joint dividing the arm into first and second linkages, the first linkage extending between the arm joint and the intermediate joint and the second linkage mounted to and rotatable about the intermediate joint and terminating in the end effector joint, and the rotation of the second linkage may occur within a plane parallel to the respective movement planes, the rotation of the second linkage being actuated by an intermediate actuator and being operable to extend an operating range within which the end effector is able to move while operating on the articles.

The column may include a linear track aligned with the direction normal to the respective movement planes and the extensible portion of the column may be mounted for movement along the linear track.

The arm rotation actuator may be housed within the extensible portion of the column.

The apparatus may include a sensor disposed to survey at least a portion of the operating range to produce location signals representing objects or articles within the surveyed portion of the operating range and may further include a controller operably configured to receive the location signals and generate control signals for causing the actuator to operate on the articles.

The sensor may be mounted to the column.

The sensor may include at least one of a LIDAR sensor or a stereoscopic camera.

The base may be disposed on a robotic vehicle, and the vehicle may further include a support surface for receiving articles loaded by the manipulator onto the support surface for transporting within a workspace.

The base may be disposed on a portion of the vehicle that is movable with respect to a chassis of the vehicle for extending the operating range of the manipulator.

The articles may include a plurality of articles disposed at a pickup location within the workspace and the vehicle may be operably configured to position the vehicle proximate the pickup location and the operating range of the manipulator may be configured to facilitate loading a least a portion of the plurality of articles without repositioning the vehicle.

The vehicle may be operably configured to position the vehicle proximate the drop-off location within the workspace and the operating range of the manipulator may be configured to facilitate unloading a plurality of articles and placing the plurality of articles at the drop-off location without repositioning the vehicle.

The support surface may include accessible portions within the operating range of the manipulator and at least one inaccessible portion and the vehicle may include an actuator operably configured to cause rotational movement between the manipulator and the support surface to cause the inaccessible portion of support surface to move within the operating range of the manipulator providing access to the at least one inaccessible portion for loading articles.

The end effector may include one of at least two actuated fingers for grasping the articles, a vacuum cup in communication with a vacuum source for grasping the articles, a spray head operably configured to direct a spray of liquid toward the articles, or a machine tool operably configured to perform a machining task on the articles.

The end effector joint may include a coupling for removably mounting any one of a plurality of end effectors to the manipulator.

The articles may include any of plant pots within a plant nursery workspace, inventory items within a warehouse workspace, packages within a within an order fulfillment warehouse workspace, or biological samples within a hospital or biological laboratory.

The end effector may include more than one articulated linkage operable to add an additional degree of freedom for movement of the end effector within the operating region.

In accordance with another disclosed aspect there is provided a robotic vehicle apparatus. The apparatus includes a support surface for receiving and transporting the articles, a first base for mounting a first manipulator configured in accordance with claim 1, at least one additional base for mounting at least one additional manipulator configured in accordance with claim 1, and the first manipulator and at least one additional manipulator are operably configured to simultaneously operate on the articles.

The first manipulator and the at least one additional manipulator may be configured for one of each manipulator independently performing the same operation on two separate articles, each manipulator independently performing a different operation on one or more articles, or collaboration between the first and additional manipulators to perform a common operation on an article.

In accordance with another disclosed aspect there is provided a manipulator apparatus for operating on articles. The apparatus includes a base mounted to a robotic vehicle at a base joint about which the base is able to rotate in response to an actuation force proceeded by a base rotation actuator. The apparatus also includes a column mounted to the rotatable base, the column having an extensible portion that is moveable with respect to the base in response to an actuation force provided by a column actuator. The apparatus further includes an arm mounted to the extensible portion of the column at an arm joint and rotatable about the arm joint in response to an actuation torque provided by an arm rotation actuator. The apparatus also includes an end effector operably configured to perform an operation on the articles, the end effector being mounted at an end effector joint disposed at an end of the arm distal to the arm joint, the end effector being rotatable about the end effector joint in response to an actuation torque provided by an end effector rotation actuator. The rotation of the end effector occurs within an end effector movement plane and the rotation of the arm occurs within an arm movement plane, the respective movement planes being substantially parallel to each other, and the extensible portion of the column is moveable in a direction normal to the respective movement planes, to provide an operating range within which the end effector is able to move with respect to the base for operating on the articles, the base joint facilitating placement of the operating range with respect to the robotic vehicle.

The column may be mounted at a portion of the base distal to the base joint about which the base rotates.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1A:
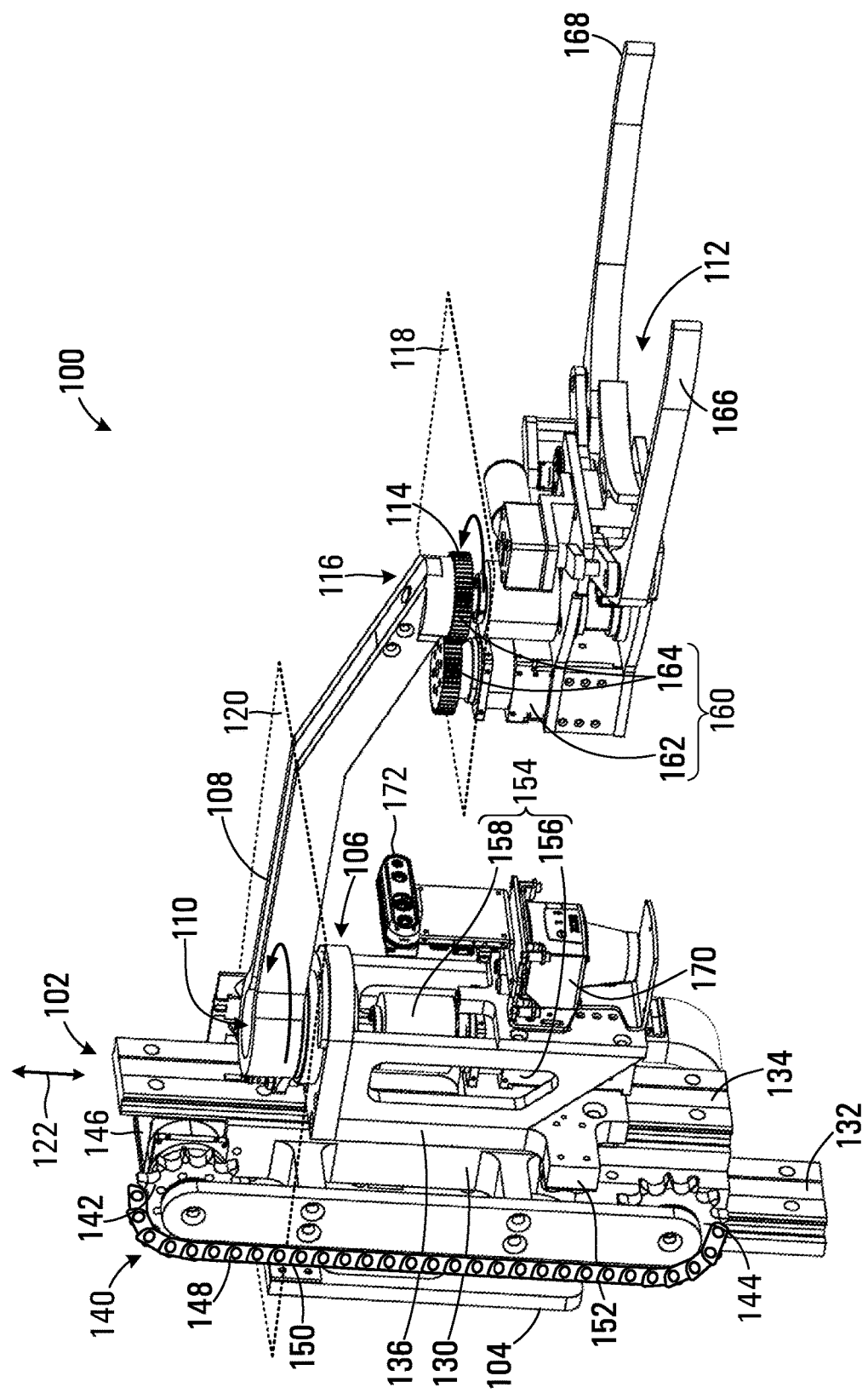
FIG. 1A is a perspective view of a manipulator apparatus according to a first disclosed embodiment in an un-extended condition.

Referring to FIG. 1A, a manipulator apparatus according to a first disclosed embodiment is shown generally at 100. The manipulator 100 includes a column 102 having a mounting portion 104 for securing the manipulator to a base (not shown). The column 102 includes an extensible portion 106 that is moveable over an extension range with respect to the mounting portion 104. In FIG. 1A the column 102 is shown in an un-extended condition.

The manipulator 100 also includes an arm 108 mounted to the extensible portion 106 of the column 102 at an arm joint 110. The arm 108 is rotatable about the arm joint 110. The manipulator 100 also includes an end effector 112 operably configured to perform an operation on articles (not shown in FIG. 1A). The end effector 112 is mounted at an end effector joint 114 disposed at an end 116 of the arm 108 distal to the arm joint 110. The end effector 112 is rotatable about the end effector joint 114 and in one embodiment includes a coupling (not shown) for removably mounting any one of a plurality of end effectors to the manipulator. For transportation of articles the end effector may be a mechanical or pneumatic gripper, or vacuum cups to grasp the articles.

The rotation of the end effector 112 occurs within an end effector movement plane 118 and the rotation of the arm 108 occurs within an arm movement plane 120. The end effector movement plane 118 and arm movement plane 120 are disposed substantially parallel to each other. The extensible portion 106 of the column 102 is moveable in a direction indicated by an arrow 122 normal to the respective movement planes 118 and 120.

Figure 1B:
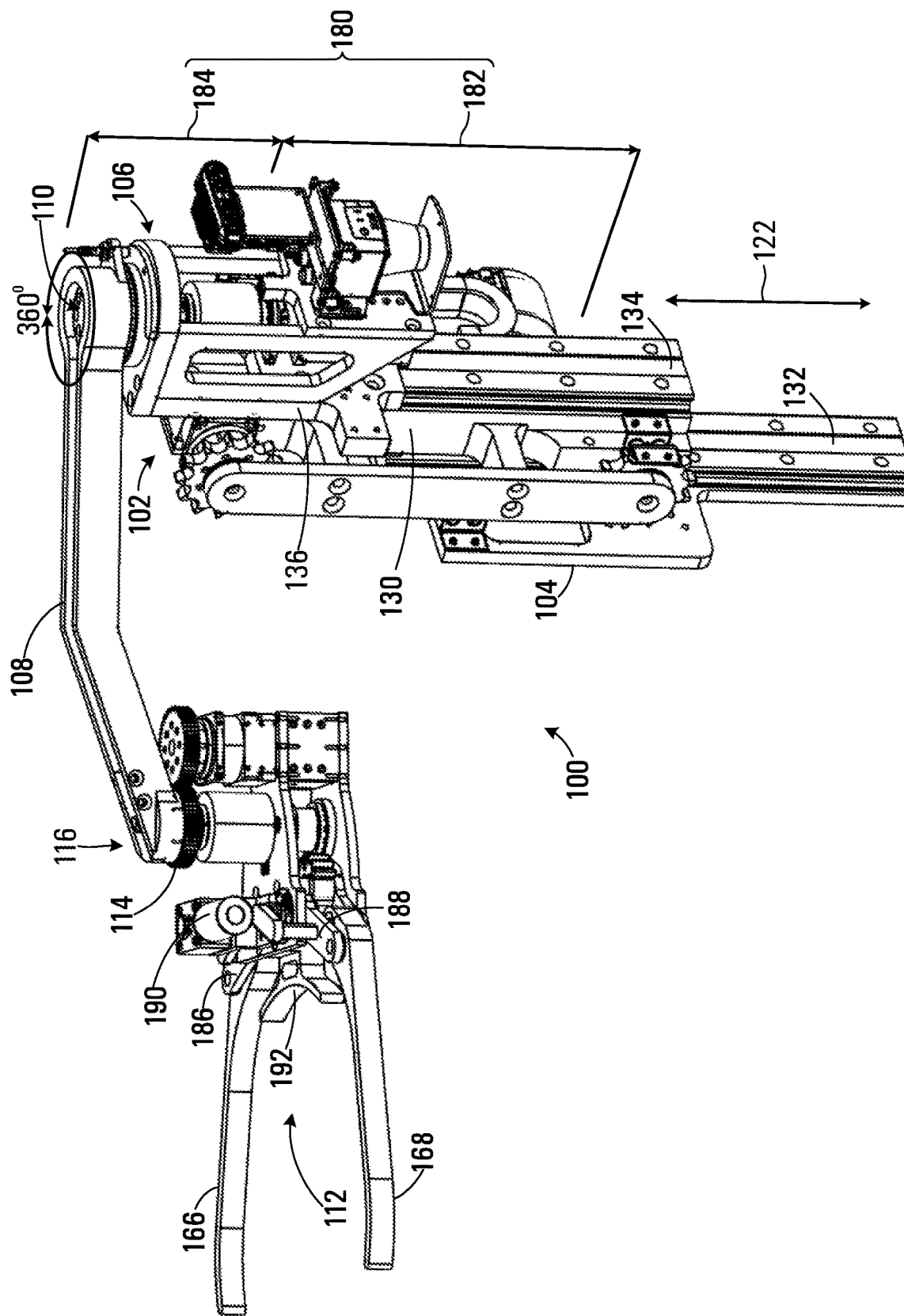
FIG. 1B is a perspective view of the manipulator apparatus of FIG. 1A in an extended condition.

In the un-extended condition of the column 102 shown in FIG. 1A, the rotation of the arm 108 about the arm joint 110 is constrained by the column 102 and in this case is limited to rotation within an arc of less than about 220° due to interference between the arm and portions of the column. Referring to FIG. 1B, the manipulator 100 is shown with the column 102 in an extended condition, which causes the arm joint 110 to be disposed above the extensible portion 106 of the column 102. In this condition the extension of the column 102 permits clearance for a full 360° rotation of the arm 108. In FIG. 1B, the arm 108 is shown rotated rearwardly behind the mounting portion 104. In the embodiment shown, the extensible portion 106 of the column 102 is moveable over an extension range 180 between the un-extended condition shown in FIG. 1A and the fully extended condition shown in FIG. 1B. Over a first portion 182 of the extension range 200 rotation of the arm 108 is constrained by the column 102 while over a second portion 184 of the range the arm joint 110 clears the column 102 and is able to rotate over the full 360° range. The rotation of the end effector 112 within the end effector movement plane 118 and the rotation of the arm 108 within the arm movement plane 120 provide an overall operating range within which the end effector is able to move for operating on articles.

Referring back to FIG. 1, in the embodiment shown, the column 102 includes a first movement stage 130 mounted for movement with respect to the mounting portion 104. The mounting portion 104 includes a linear track 132 on which the first movement stage 130 is mounted for movement in the direction 122 aligned normal to the movement planes 118 and 120. The first movement stage 130 includes a further linear track 134 and the column 102 includes a second movement stage 136 mounted on the linear track 134 and aligned for movement with respect to the first movement stage 130 in the direction 122. The extensible portion 106 of the column 102 is mounted on the second movement stage 136 and the arm joint 110 is disposed at a distal end of the second movement stage 136.

In the embodiment shown in FIG. 1A, the first movement stage 130 includes a column actuator 140, which includes a driven sprocket 142 and an idler sprocket 144. The driven sprocket 142 is coupled to a motor 146 that delivers a torque to the sprocket. A chain 148 extends between the driven and the idler sprockets 142 and 144 and a front portion of the chain 148 is shown omitted in FIG. 1A to avoid obscuring other elements of the manipulator 100. The chain 148 is connected to the mounting portion 104 at a lug 150 and to the second movement stage 136 at a lug 152. When the motor 146 delivers an anticlockwise torque to the driven sprocket 142, a resulting column actuation force is transmitted by the chain 148 to the lug 150 causing the first movement stage 130 to be raised with respect to the mounting portion 104. Similarly, the column actuation force transmitted by the chain 148 to the lug 152 on the second movement stage 136 causes the second movement stage to be raised with respect to the first movement stage 130. Accordingly in this embodiment the first movement stage 130 and second movement stage 136 undergo corresponding displacements in the same direction in response to a movement of the chain 148 by the motor 146 to cause the column 102 to be extended as shown in FIG. 1B. The column 102 may be lowered back to the un-extended state shown in FIG. 1 by causing the motor 146 to generate a clockwise torque. In other embodiments, the chain 148 and sprockets 142, 144 may be replaced by any other lift mechanism, such as a toothed belt or a cable-and-pulley system attached to anchor points, for example.

The arm joint 110 is a revolute joint and an arm rotation actuator 154 that delivers an actuation torque to the arm 108 to cause rotation of the arm about the joint within the movement plane 120. In this case the rotation actuator 154 includes a motor 156 that delivers a torque via a gearbox 158 to the arm 108. Similarly, the end effector joint 114 is a revolute joint and an end effector rotation actuator 160 includes a motor 162 that delivers an actuation torque via a plurality of gears 164 to cause rotation of the end effector 112 about the end effector joint in the end effector movement plane 118.

In the embodiment shown the manipulator 100 also includes a sensor 170 mounted on the extensible portion 106 of the column. The sensor 170 is disposed to survey at least a portion of the operating range in front of the manipulator and produce location signals representing objects or articles within the surveyed portion of the operating range. The location signals may be received by a controller (not shown) which is operably configured to generate control signals in response to the received location signals for causing the actuator to operate on the articles. The signals may be interpreted by the controller to determine the size and shape of the article and/or a location of an article being operated on with respect to other articles and other obstructions within the operating range. In this embodiment the sensor 170 is implemented as a LIDAR sensor. A range of two-dimensional (2D) LIDAR sensors are available from vendors such as Sick AG, Germany. In this embodiment the manipulator 100 also includes a stereoscopic camera 172, which may be used to capture images of the operating range and/or provide measurement data of objects in the operating range. In one embodiment the stereoscopic camera 172 is implemented using an Intel® RealSense™ depth camera. Either the LIDAR sensor 170 or the stereoscopic camera 172 may be used to provide information from within the operating range of the manipulator 100. However the LIDAR sensor 170 does not require that the operating range be illuminated and may provide measurement information having better accuracy and precision than a stereoscopic camera.

Figure 2B:
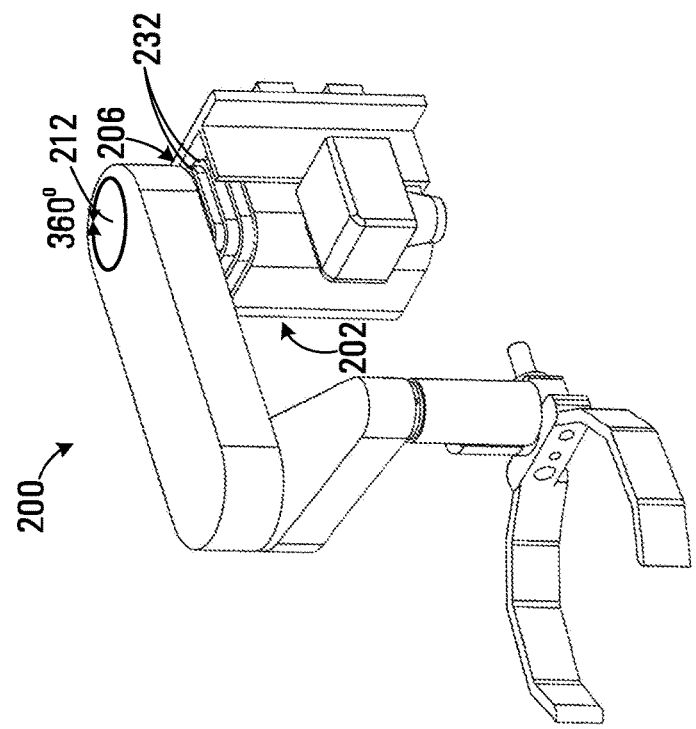
FIG. 2B is a perspective view of the manipulator apparatus of FIG. 2A in an un-extended condition.
Figure 2A:
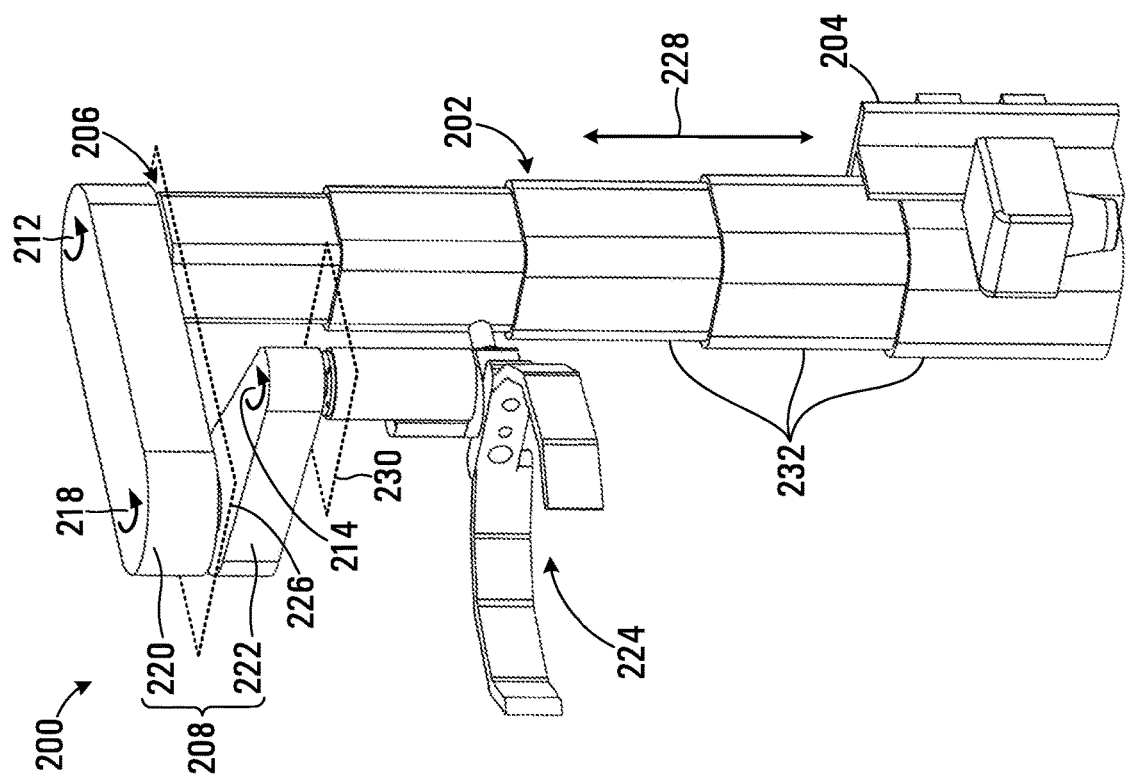
FIG. 2A is a perspective view of a manipulator apparatus according to another disclosed embodiment in an extended condition.

Referring to FIG. 2A a manipulator apparatus according to another disclosed embodiment is shown generally at 200 in an extended condition. The manipulator 200 includes a column 202 having a mounting portion 204 for securing the manipulator to a base (not shown). The column 202 includes an extensible portion 206 that is moveable over an extension range with respect to the mounting portion 204. The manipulator 200 also includes an arm 210 mounted to the extensible portion 206 of the column 202 for rotation about an arm joint 212. The arm 210 also includes an end effector joint 214 disposed at an end of the arm 208.

In this embodiment the arm 210 includes an intermediate joint 218 disposed between the arm joint 212 and the end effector joint 214. The intermediate joint 218 divides the arm into a first linkage 220 that extends between the arm joint 212 and the intermediate joint 218, and a second linkage 222 mounted to and rotatable about the intermediate joint and terminating in the end effector joint 216. The manipulator 200 also includes an end effector 224, which is mounted at the end effector joint 214 and rotatable about the end effector joint. Rotation of the first linkage 220 about the arm joint 212 and rotation of the second linkage 222 about the intermediate joint 218 occurs within a movement plane 226. Rotation of the end effector 224 occurs within a plane 230, which is parallel to the movement plane 228. The rotation of the second linkage 222 is actuated by an intermediate actuator (not shown) and is operable to extend an operating range of the manipulator 200. The column 202 is extensible via a plurality of telescoping sections 232 that move in a direction 228, which is normal to the movement planes 226 and 230.

In this embodiment the end effector 112 is configured as a gripper and has a pair of fingers 166 and 168 coupled via linkages 186 and 188 (FIG. 1B) to an actuator 190. The end effector 112 also includes a static bar 192 disposed between the fingers. In this embodiment the static bar 192 is sculpted to conform to a generally cylindrical shaped article. The actuator 190 is activated to cause the pair of fingers 166 and 168 to move apart to open for grasping an article and the end effector 112 is then moved by a combination of movements of the arm 108 and end effector to engage the article. The actuator 190 is then activated to close the fingers, which would thus cause a generally cylindrical article to be engaged by each of the fingers 166 and 168 and the static bar 192. The end effector 112 is thus configured to grip articles of varying size at three points of engagement (i.e. each of the fingers and the static bar 192).

In other embodiments the end effector 112 may be replaced with any of a variety of other differently configured end effectors. Examples of some other end effectors that may be coupled to the end effector joint 114 include multi-finger grippers, vacuum cups, and pneumatic grippers.

Referring to FIG. 2B, the manipulator 200 is shown in an un-extended condition where the plurality of telescoping sections 232 are shown fully collapsed within each other. In this embodiment the extensible portion 206 of the column 202 is disposed to permit a full 360° rotation of the arm even when the column 202 is un-extended as shown. The arm joint 212 and the first linkage 220 of the arm 210 are thus able to move though the full 360° rotation over the full extension range of the column 202.

Figure 3A:
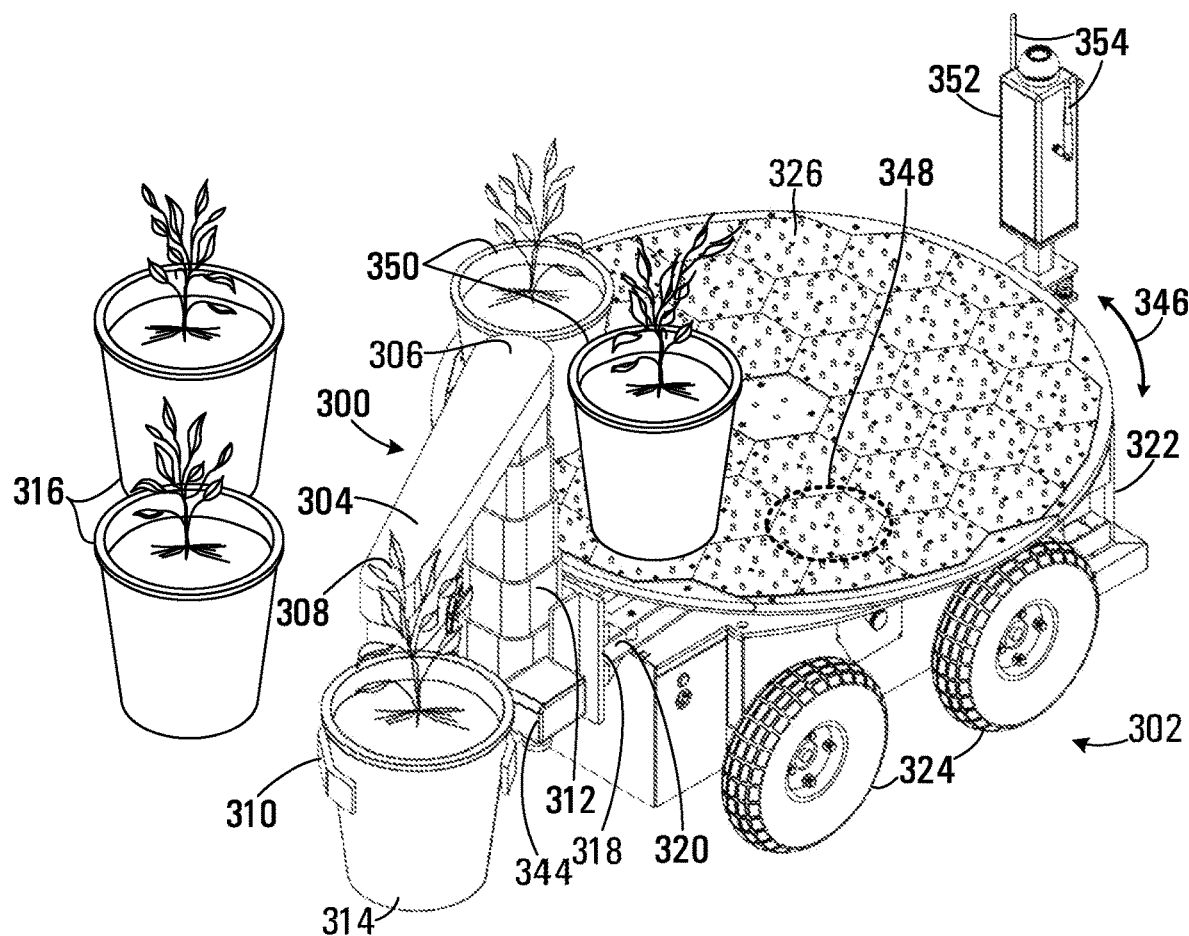
FIG. 3A is a perspective view of a robotic vehicle and an alternative manipulator embodiment.

Referring to FIG. 3A, an alternative embodiment of the manipulator of FIG. 2 is shown generally at 300. The manipulator 300 is mounted on a robotic vehicle 302 and only differs from the manipulator embodiment shown in FIG. 2 in that the intermediate joint (218 in FIG. 2) is omitted from an arm 304 and the arm thus has a single linkage extending between an arm joint 306 and an end effector joint 308. The manipulator 300 includes an end effector 310 for operating on articles. In the embodiment shown, an extensible column 312 of the manipulator 300 is shown partially extended while lifting a plant pot 314 in a plant nursery workspace where a plurality of plant pots 316 are being operated on by the robotic vehicle 302.

In this embodiment the manipulator 300 has a mounting portion 318 mounted to a base 320 associated with the robotic vehicle 302. The robotic vehicle 302 includes a wheeled chassis 322 having a pair of drive wheels 324 on each side of the chassis (only one pair of the drive wheels is visible in FIG. 3). In this embodiment the robotic vehicle 302 also includes a support surface 326 oriented to support an underside of the plant pot articles 316 to be transported.

Figure 3B:
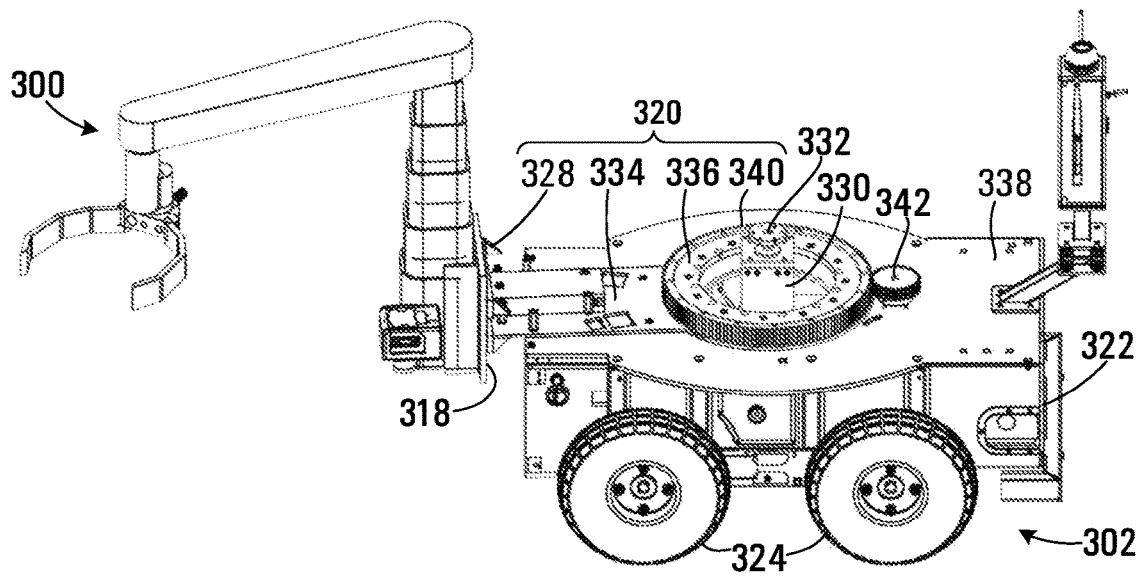
FIG. 3B is a further perspective view of the robotic vehicle shown in FIG. 3A.

Referring to FIG. 3B, the robotic vehicle 302 is shown in a side perspective view with the support surface 326 removed to reveal the base 320. The base 320 includes mounting features 328 for mounting the manipulator 300 to the base. In one embodiment the mounting features 328 are standardized so that any one of the manipulators 100, 200, or 300 can be mounted on the robotic vehicle 302 depending on the operations to be performed or the articles that are to be operated on. The robotic vehicle 302 includes a rotational actuator 330 coupled to a mounting flange 332 for mounting the support surface 326. The support surface 326 is operably configured to be selectively rotated by the rotational actuator 330.

In the embodiment shown the base 320 includes a plate 334, which is coupled to a hub 336. The hub 336 is mounted on an upper plate 338 of the chassis 322. The base 320 also includes an annular gear 340, which is mounted for rotation about the hub 336. The annular gear 340 is driven by a base drive gear 342, which is coupled to a base actuator (not shown) disposed below the upper plate 338 and operable to deliver a torque to the base drive gear 342. Rotation of the base drive gear 342 is coupled to the annular gear 340 and causes the base 320 to rotate about the hub 336. In this embodiment the base 320 is thus disposed on a portion of the robotic vehicle 302 that is movable with respect to the chassis 322. The base 320 is thus able to rotate the manipulator 300 under the support surface 326 while the vehicle 302 remains stationary. The base 320 thus provides an additional degree of freedom for the manipulator 300 having an advantage of extending the operating range of the manipulator while the vehicle 302 remains stationary.

In other embodiments the rotatable base 320 may be replaced with a base fixed to the top plate 338 or elsewhere on the chassis 322 and the drive wheels 324 may be used to reposition the vehicle 302 such that the manipulator 300 is able to operate on articles outside of a current operating range of the vehicle.

Referring back to FIG. 3A, in the embodiment shown the manipulator 300 includes a LIDAR sensor 344 which is generally configured as described above in connection with the sensor 170 on the manipulator 100. In the example shown, the robotic vehicle 302 positions itself with aid of the LIDAR sensor 344 proximate the plant pot articles 316 and uses the end effector 310 to grasp each article (i.e. the plant pot 314). The extensible column 312 is then extended to lift the plant pot 314 such that the bottom of the pot is at a height above the support surface 326. The support surface 326 may be rotated as indicated by the arrow 346 to move already loaded plant pots 350 to dispose an unused portion 348 of the support surface 326 in a location that is also accessible by the manipulator 300. An arm actuator is then actuated to rotate the arm 304 about the arm joint 306 to move the plant pot 314 toward the accessible portion 348 of the support surface 326. The end effector joint 308 may similarly be activated to cause rotation of the end effector 310 about the end effector joint to align the bottom of the pot 314 with the accessible portion 348. The extensible column 312 is then lowered to place the pot 314 on the support surface 326. In this embodiment the support surface 326 includes a plurality of sprung pins that are displaced by the base of the plant pot 314 and the remaining pins prevent lateral movement of the pot on the support surface 326 during transport.

Generally, articles such as the plant pots 316 may be disposed at a pickup location within a workspace such as a nursery. The robotic vehicle 302 is operably configured to position the vehicle proximate the pickup location the operating range of the manipulator 300 is configured to facilitate loading a least a portion of the articles without repositioning the vehicle. Similarly, at a drop-off location the robotic vehicle 302 is positioned proximate the drop-off location and the operating range of the manipulator 302 facilitates unloading the articles and placing articles at the drop-off location without repositioning the vehicle.

The robotic vehicle 302 also includes a wireless interface housing 352 having one or more antenna 354 for establishing wireless communications with a host controller (not shown) that is used to communicate with a controller of the robotic vehicle.

Figure 4:
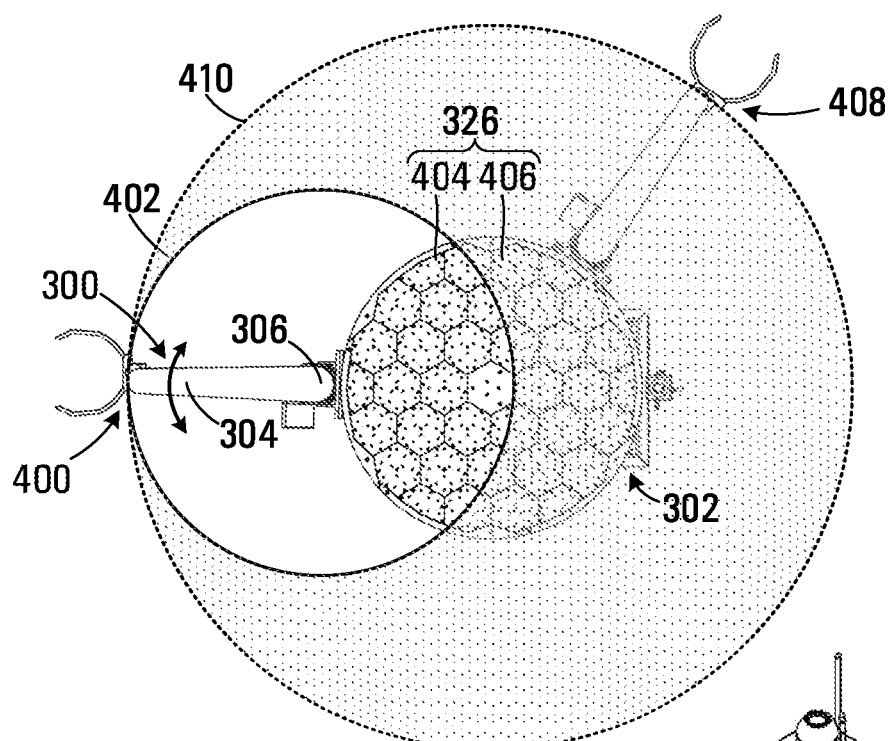
FIG. 4 is a plan view depicting a reachable operating range for the manipulator and vehicle shown in FIGS. 3A and 3B.

Referring to FIG. 4, the robotic vehicle 302, manipulator 300, and a depiction of a reachable operating range are shown in plan view. In this case the robotic vehicle is considered to be to be stationary and the drive wheels 324 do not move. The arm 304 of the manipulator 300 is initially disposed at a first location 400, where it is able to rotate about the arm joint 306 within a region indicated by a circular broken line 402. This region will be a cylindrical volume due to the extensible column 312. Under these conditions, only a first portion 404 of the support surface 326 is accessible, while a remaining portion 406 is inaccessible.

Under these conditions, only a first portion 404 of the support surface 326 is accessible within the operating range of the manipulator 300. The support surface 326 includes at least one inaccessible portion 406 that cannot be reached by the manipulator 300. However in the embodiment shown the robotic vehicle 302 includes the rotational actuator 330 that facilitates rotational movement of the support surface 326 with respect to the manipulator 300. The support surface 326 is thus rotatable to bring the inaccessible portion 406 within the operating range of the manipulator 300 providing access to the inaccessible portion for loading articles without moving the base of the manipulator 300.

The manipulator 300 is further able to move on the rotatable base (320 in FIG. 3A, 3B) to other locations such as the location 408, thus providing access to a cylindrical overall operating region 410. The region 402 provided by the rotation of the arm 304 together with the rotation of the support surface 326 provides access for loading articles onto all portions of the support surface. Further, the mounting of the manipulator 300 on the rotatable base further extends the operating range of the arm 304 to the overall operating region 410 for operating on articles located on the ground to all sides of the robotic vehicle 302.

The manipulators 100 or 200 may be similarly mounted to the base of the robotic vehicle 302 and will have a generally similar overall operating range to the manipulator 300.

Figure 5:
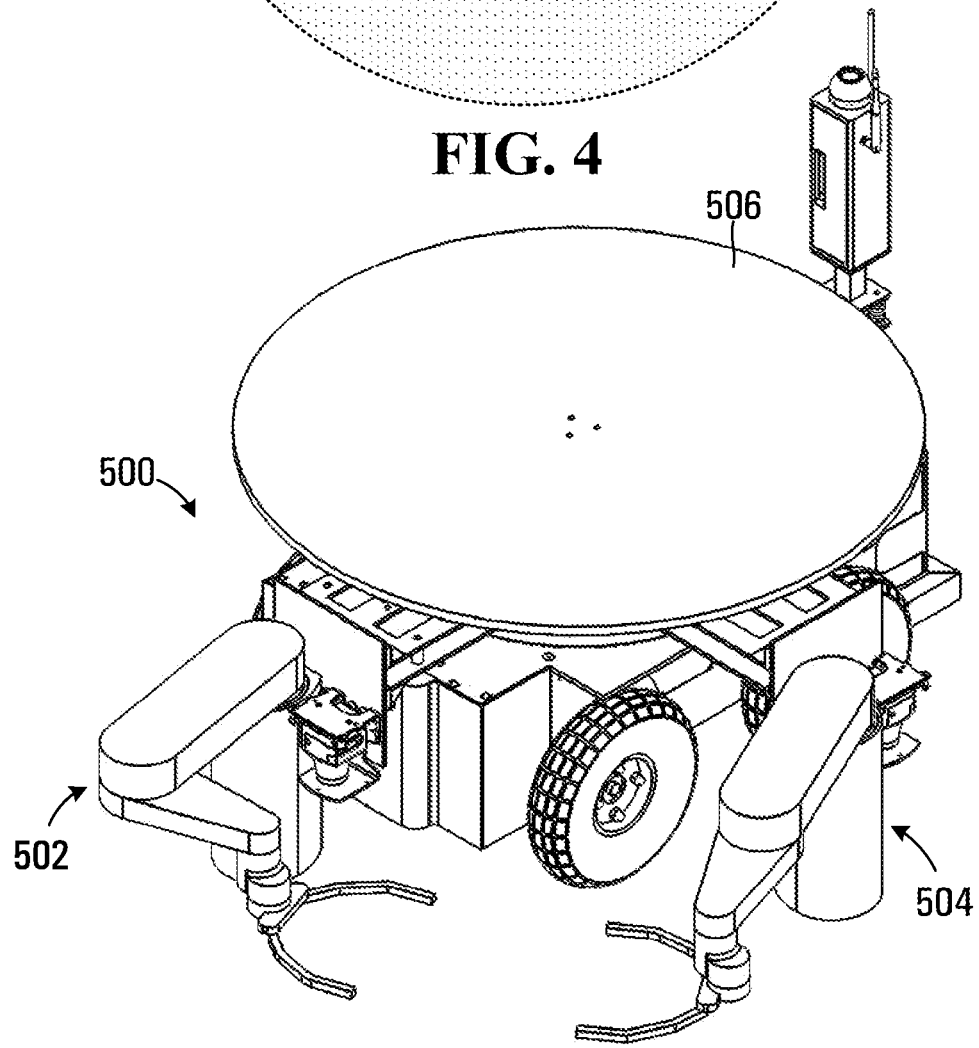
FIG. 5 is a perspective view of a robotic vehicle having two manipulators according to another disclosed embodiment.

Referring to FIG. 5, in another embodiment two of the manipulators 200 shown in FIG. 2 are disposed on a robotic vehicle 500. The robotic vehicle 500 includes a first base for mounting a first manipulator 502, generally configured as described above in connection with FIGS. 2A and 2B. The robotic vehicle 500 further includes a second base for mounting a second manipulator 504. Each of the first manipulator 502 and second manipulator 504 is independently operable to perform an operation on separate articles, such as simultaneously loading articles onto a support surface 506. In other embodiments further manipulators (i.e. more than two manipulators) may be mounted on the robotic vehicle 500. The use of two or more manipulators simultaneously facilitates an increased rate of operations such as loading or unloading.

Figure 6:
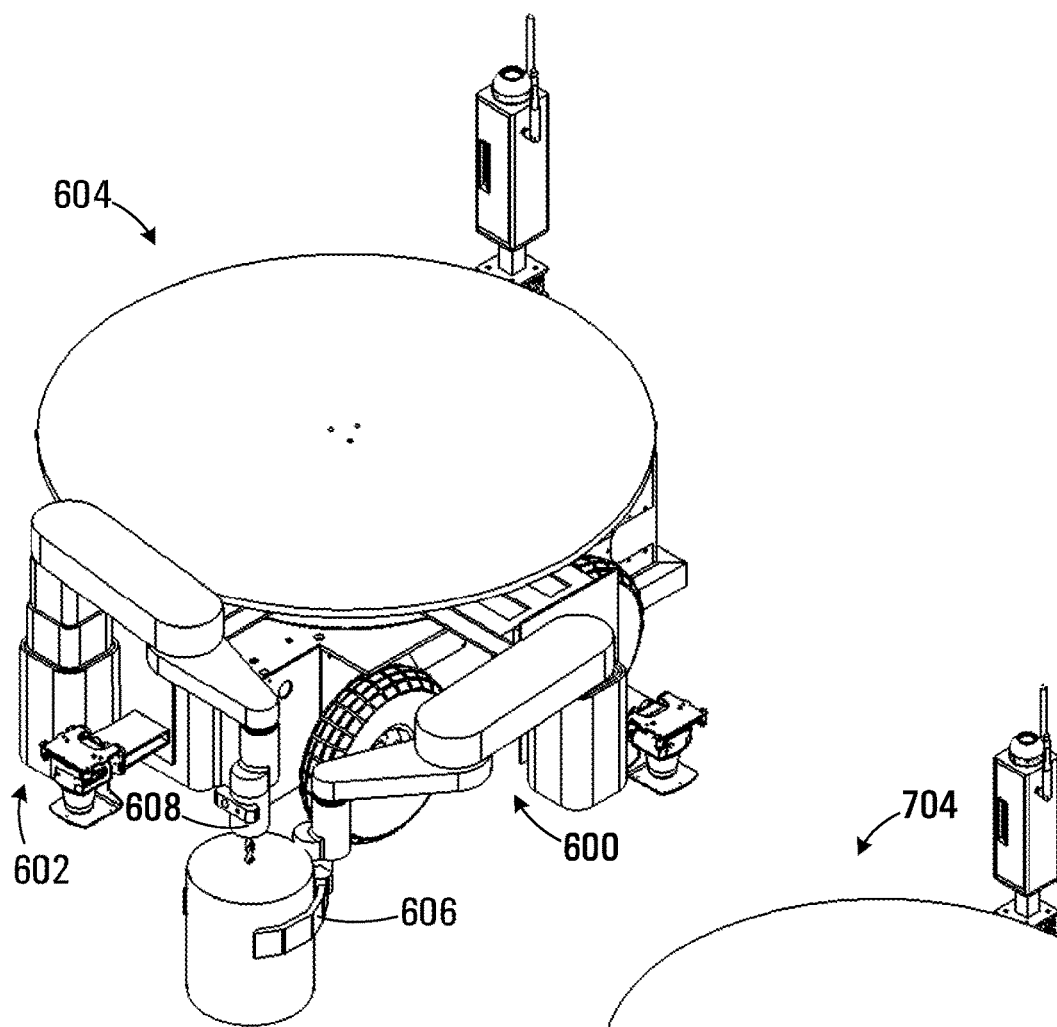
FIG. 6 is a perspective view of a robotic vehicle having two manipulators according to yet another disclosed embodiment.

Referring to FIG. 6, in another embodiment two manipulators 600 and 602 are disposed on a robotic vehicle 604. The manipulator 600 has a gripper end effector 606 while the manipulator 608 includes a drilling end effector 610. In one embodiment the gripper end effector 606 of the manipulator 600 may be used to hold and/or transport the article, while the drilling end effector 610 of the manipulator 602 drills a hole in the article. Each manipulator 600 and 602 thus independently performs a different operation on an article.

Figure 7:
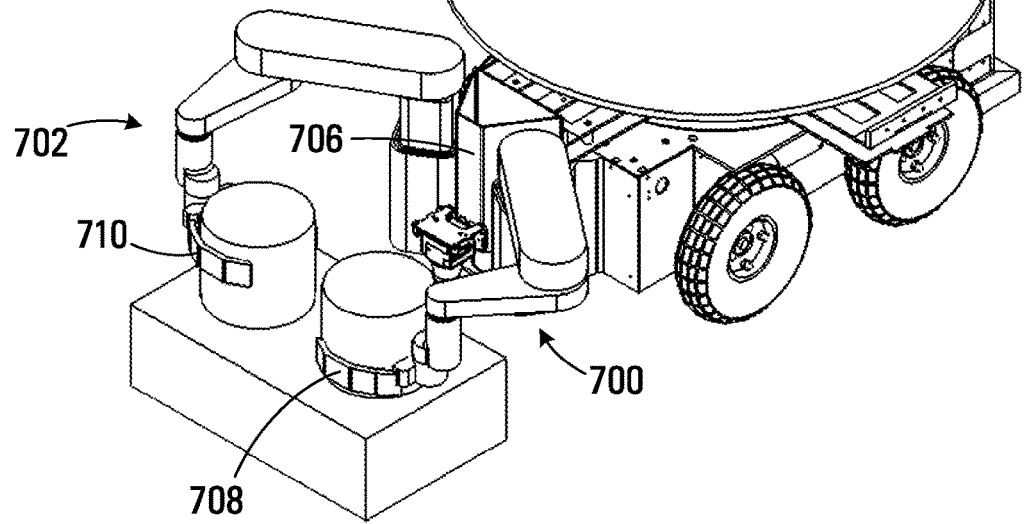
FIG. 7 is a perspective view of a robotic vehicle having two manipulators according to a further disclosed embodiment.

Referring to FIG. 7, in another embodiment two manipulators 700 and 702 are disposed on a robotic vehicle 704 at a support structure 706. Each of the manipulators 700 and 702 have a respective gripper end effector 708 and 710. The manipulators 700 and 702 are configured to collaboratively load an article. The manipulators 700 and 702 are thus configured for collaboration between the manipulators to perform a common operation on an article.

In embodiments where the articles are plants in a nursery as described above, the end effector may be configured for operations such as spraying of pesticides, herbicides, or other liquids onto the plants. The manipulators and/or robotic vehicles described herein may alternatively be used in other applications such as transporting of blood samples within a health care facility or transporting packages within a fulfillment facility.

While specific embodiments have been described and illustrated, such embodiments should be considered illustrative only and not as limiting the disclosed embodiments as construed in accordance with the accompanying claims.

What is claimed is:

1. A manipulator apparatus for operating on articles, the apparatus comprising:
    a column having a mounting portion for securing the manipulator to a base and an extensible portion that is moveable over an extension range with respect to the mounting portion in response to an actuation force provided by a column actuator;
    an arm mounted to the extensible portion of the column at an arm joint and rotatable about the arm joint in response to an actuation torque provided by an arm rotation actuator;
    an end effector operably configured to perform an operation on the articles, the end effector being mounted at an end effector joint disposed at an end of the arm distal to the arm joint, the end effector being rotatable about the end effector joint in response to an actuation torque provided by an end effector rotation actuator;
    wherein the rotation of the end effector occurs within an end effector movement plane and the rotation of the arm occurs within an arm movement plane, the respective movement planes being substantially parallel to each other, and wherein the extensible portion of the column is moveable in a direction normal to the respective movement planes and the extensible portion of the column causes the arm joint to be disposed to permit clearance for a full 360° rotation of the arm over at least a portion of the extension range of the extensible portion of the column to provide an operating range within which the end effector is able to move for operating on the articles, the rotation of the arm about the arm joint being constrained by the column when the extensible portion of the column is un-extended.

2. The apparatus of claim 1 wherein the extensible portion of the column comprises at least first and second movement stages, the first movement stage being mounted for movement with respect to the mounting portion and the second movement stage being mounted on the first movement stage for movement with respect to the first movement stage, the arm joint being disposed at a distal end of the second movement stage.

3. The apparatus of claim 1 wherein the arm comprises:
    an intermediate joint disposed between the arm joint and the end effector joint, the intermediate joint dividing the arm into first and second linkages, the first linkage extending between the arm joint and the intermediate joint and the second linkage mounted to and rotatable about the intermediate joint and terminating in the end effector joint; and wherein the rotation of the second linkage occurs within a plane parallel to the respective movement planes, the rotation of the second linkage being actuated by an intermediate actuator and being operable to extend an operating range within which the end effector is able to move while operating on the articles.

4. The apparatus of claim 1 wherein the column comprises a linear track aligned with the direction normal to the respective movement planes and wherein the extensible portion of the column is mounted for movement along the linear track.

5. The apparatus of claim 1 wherein the arm rotation actuator is housed within the extensible portion of the column.

6. The apparatus of claim 1 wherein the end effector comprises one of:
- at least two actuated fingers for grasping the articles;
- a vacuum cup in communication with a vacuum source for grasping the articles;
- a spray head operably configured to direct a spray of liquid toward the articles; or
- a machine tool operably configured to perform a machining task on the articles.

7. The apparatus of claim 1 wherein the end effector joint comprises a coupling for removably mounting any one of a plurality of end effectors to the manipulator.

8. The apparatus of claim 1 wherein the articles comprise any of:
- plant pots within a plant nursery workspace;
- inventory items within a warehouse workspace;
- packages within a within an order fulfillment warehouse workspace; or
- biological samples within a hospital or biological laboratory.

9. The apparatus of claim 1 wherein the end effector comprises more than one articulated linkage operable to add an additional degree of freedom for movement of the end effector within the operating region.

10. The apparatus of claim 1 further comprising a sensor disposed to survey at least a portion of the operating range to produce location signals representing objects or articles within the surveyed portion of the operating range and further comprising a controller operably configured to receive the location signals and generate control signals for causing the actuator to operate on the articles.

11. The apparatus of claim 10 wherein the sensor is mounted to the column.

12. The apparatus of claim 10 wherein the sensor comprises at least one of a LIDAR sensor or a stereoscopic camera.

13. The apparatus of claim 1 wherein the base is disposed on a robotic vehicle, the vehicle further comprising a support surface for receiving articles loaded by the manipulator onto the support surface for transporting within a workspace.

14. The apparatus of claim 13 wherein the base is disposed on a portion of the vehicle that is movable with respect to a chassis of the vehicle for extending the operating range of the manipulator.

15. The apparatus of claim 13, wherein the articles comprise a plurality of articles disposed at a pickup location within the workspace and wherein the vehicle is operably configured to position the vehicle proximate the pickup location and wherein the operating range of the manipulator is configured to facilitate loading a least a portion of the plurality of articles without repositioning the vehicle.

16. The apparatus of claim 13 wherein the vehicle is operably configured to position the vehicle proximate the drop-off location within the workspace and wherein the operating range of the manipulator is configured to facilitate unloading a plurality of articles and placing the plurality of articles at the drop-off location without repositioning the vehicle.

17. The apparatus of claim 13 wherein the support surface comprises accessible portions within the operating range of the manipulator and at least one inaccessible portion and wherein the vehicle includes an actuator operably configured to cause rotational movement between the manipulator and the support surface to cause the inaccessible portion of support surface to move within the operating range of the manipulator providing access to the at least one inaccessible portion for loading articles.

18. The apparatus of claim 1, further comprising:
a robotic vehicle apparatus comprising:
- a support surface for receiving and transporting the articles;
- a first base for mounting a first manipulator;
- at least one additional base for mounting at least one additional manipulator;

and wherein the first manipulator and at least one additional manipulator are operably configured to simultaneously operate on the articles.

19. The apparatus of claim 18 wherein the first manipulator and the at least one additional manipulator are configured for one of:
- each manipulator independently performing the same operation on two separate articles;
- each manipulator independently performing a different operation on one or more articles; or
- collaboration between the first and additional manipulators to perform a common operation on an article.

20. A manipulator apparatus for operating on articles, the apparatus comprising:
- a base mounted to a robotic vehicle at a base joint about which the base is able to rotate in response to an actuation force proceeded by a base rotation actuator;
- a column mounted to the rotatable base, the column having an extensible portion that is moveable with respect to the base in response to an actuation force provided by a column actuator;
- an arm mounted to the extensible portion of the column at an arm joint and rotatable about the arm joint in response to an actuation torque provided by an arm rotation actuator;
- an end effector operably configured to perform an operation on the articles, the end effector being mounted at an end effector joint disposed at an end of the arm distal to the arm joint, the end effector being rotatable about the end effector joint in response to an actuation torque provided by an end effector rotation actuator;
- wherein the rotation of the end effector occurs within an end effector movement plane and the rotation of the arm occurs within an arm movement plane, the respective movement planes being substantially parallel to each other, and wherein:
    - the extensible portion of the column is moveable in a direction normal to the respective movement planes to provide an operating range within which the end effector is able to move with respect to the base for operating on the articles, the base joint facilitating placement of the operating range with respect to the robotic vehicle;

the extensible portion of the column causes the arm joint to be disposed to permit clearance for a full 360° rotation of the arm over at least a portion of the extension range of the extensible portion of the column to provide an operating range within which the end effector is able to move for operating on the articles, the motion of the arm about the arm joint being constrained by the column when the extensible portion of the column is un-extended.

21. The apparatus of claim 20 wherein the column is mounted at a portion of the base distal to the base joint about which the base rotates.

* * * * *